United States Patent [19]

Derman

[11] Patent Number: 4,907,111
[45] Date of Patent: Mar. 6, 1990

[54] LOCKING DEVICE FOR FLOPPY DISK DRIVES

[76] Inventor: Jay S. Derman, 1201 N. Catalina Ave. P.O. Box 949, Redondo Beach, Calif. 90277-0949

[21] Appl. No.: 297,574

[22] Filed: Jan. 17, 1989

Related U.S. Application Data

[63] Continuation-in-part of Ser. No. 269,119, Nov. 9, 1988, abandoned.

[51] Int. Cl.[4] .................. G11B 5/012; E05B 73/00
[52] U.S. Cl. .................................. 360/97.02; 70/14; 70/58; 360/97.04; 360/99.01
[58] Field of Search .................................. 70/14, 58; 360/97.01–97.04, 99.01–99.05, 137

[56] References Cited

U.S. PATENT DOCUMENTS 4,685,312  8/1987  Lakoski .................................. 70/14

Primary Examiner—A. J. Heinz
Attorney, Agent, or Firm—Monty Koslover Assoc.

[57] ABSTRACT

A device for locking a floppy disk drive so that the drive can not be used to read the files stored on the diskettes. The preferred embodiment of the device is made of two assemblies, one of which includes a blank diskette which is inserted in the open empty disk drive. The second assembly, acting as a clamp, is placed over the protruding face of the first assembly in a manner so that the disk drive lever is enclosed by a cutout or notch in the clamp, and a lock screw in the clamp engages the first assembly. Alternately, no blank diskette is utilized with the first assembly. Instead, the first assembly includes a hard plastic tongue which is inserted in the open disk drive. Rotating the lock screw by a key placed in the clamp barrel lock, pulls the clamp until it is tightly seated against the disk drive face, preventing the disk drive from being opened and a diskette inserted.

7 Claims, 3 Drawing Sheets

LOCKING DEVICE FOR FLOPPY DISK DRIVES

This application is a continuation-in-part of application Ser. No. 07/269,119 filed Nov. 9, 1988 and now abandoned.

BACKGROUND OF THE INVENTION

1. Field of the Invention

This invention relates to locking devices used for securing computer equipment and more particularly, to a device that will prevent unauthorized use of the floppy disk drives to access a computer and read the contents of the diskettes.

2. Description of the Prior Art

There are currently many ways for the owner of a Personal Computer (PC) to lock up his computer, either to prevent unauthorized use or to prevent it from being stolen. A typical computer products catalog might easily have several devices that attach to the PC and prevent it from being removed by unauthorized persons. There are also devices that attach to the power cord connection and prevent the PC from being switched on. Similarly, there are locking devices that attach to the PC and cause the keyboard to "freeze" while the PC is turned on, thus preventing its use. All the foregoing typically require modifying the PC in some way, whether by drilling holes for attachments or by insertion of some device.

If a PC owner should want to simply prevent the reading of files on his diskettes, or possibly to prevent turning on the PC, he would at present have to use one of the foregoing devices that modify the PC. There is thus a need for a simple locking device that will prevent access to the floppy disk drives and can be easily removed when unlocked, without marring or modifying the PC in any way.

SUMMARY OF THE INVENTION

There are two embodiments of the invention. The first is for application to PC's having floppy disk drives which are opened and closed by a lever. These drives are typical of those installed on "IBM PC" Clones. The second alternate embodiment is for application to the type of drive found on the "APPLE MACINTOSH" PC.

The first embodiment comprises two assemblies and a blank diskette. One of the assemblies is a diskholder designed with a projection that is used to hook on to the front-most edge of the diskette. This is the edge opposite to the diskette reading slot. The diskholder assembly also has a tapped screw hole in the center of its face. When in use, the diskholder assembly attached to the blank floppy disk is inserted in an open disk drive and the drive lever is rotated down, closing the drive. The second assembly, which is a clamp cover, is then placed over the first assembly so that a cutout in the clamp covers the disk drive lever. A key is placed in a barrel lock in the clamp cover and the lock screw that now engages the diskholder assembly is turned until the clamp cover is tightly seated against the diskholder assembly. In this position, the disk drive lever is prevented by the clamp cover from being opened, and the blank diskette can not be removed. Thus, the disk drive can not be used unless the device is unlocked and removed. Where the "A" drive is also used to "boot up" the operating system or bring up a hard disk, the PC will also be prevented from operation by use of the disk drive locking device.

This first embodiment can be used on any disk drive using 5¼ inch diskettes and having a lever for opening or closing the drive.

The second embodiment does not utilize a blank diskette. Instead, its equivalent diskholder assembly incorporates a tongue piece, that is inserted in the slot of the diskette drive and moved sideways until a projection on the tongue piece catches on the inside edge of the slot, holding the assembly in place. A clamp cover assembly similar to that in the first embodiment, is placed over the first assembly and the lock screw is engaged and turned by a key until the clamp cover is tightly seated on the first assembly and against the front surface of the PC. In this position, the disk drive cannot be used unless the device is unlocked and removed.

Accordingly, it is a principal object of this invention to provide a device that will securely lock a PC floppy disk drive and prevent its unauthorized use to read diskettes or otherwise operate the computer.

Another object is to provide a device that does not require any modification of the PC for its use.

Other objects and advantages of the present invention will be apparent from the study of the following portions of the specification, the claims and the attached drawings.

DESCRIPTION OF THE PREFERRED EMBODIMENTS

Figure 1:
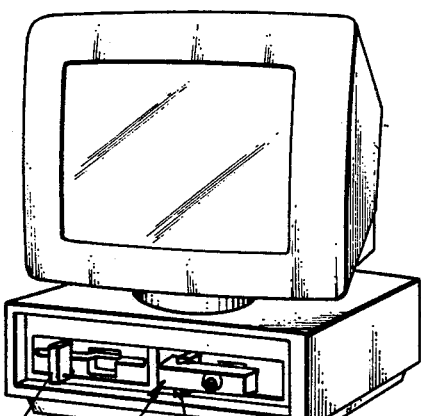
FIG. 1 is a perspective view of a typical PC computer clone showing the first embodiment of the present invention locked in place covering one of the two disk drives and preventing its use.

Referring particularly to the drawings, there is shown in FIG. 1 a perspective view of a Personal Computer (PC) 1 of the "IBM PC" clone type, utilizing a first preferred embodiment of the present invention locking device 2 to secure a disk drive. These disk drives are known generically as "floppy disk" drives to distinguish them from the "hard disk" drives which do not use diskettes and have a very large capacity, (e.g., 10 megabytes or more) for storage.

The disk drive lever 3 is prevented by the locking device 2 from being rotated, thereby opening the disk drive. In this representation, the disk drive levers 3 are shown located on the left side of the drives. However, in some PC's they may also be located to the right side. The locking device 2 therefore has to be capable of adaptation to either configuration.

Figure 2:
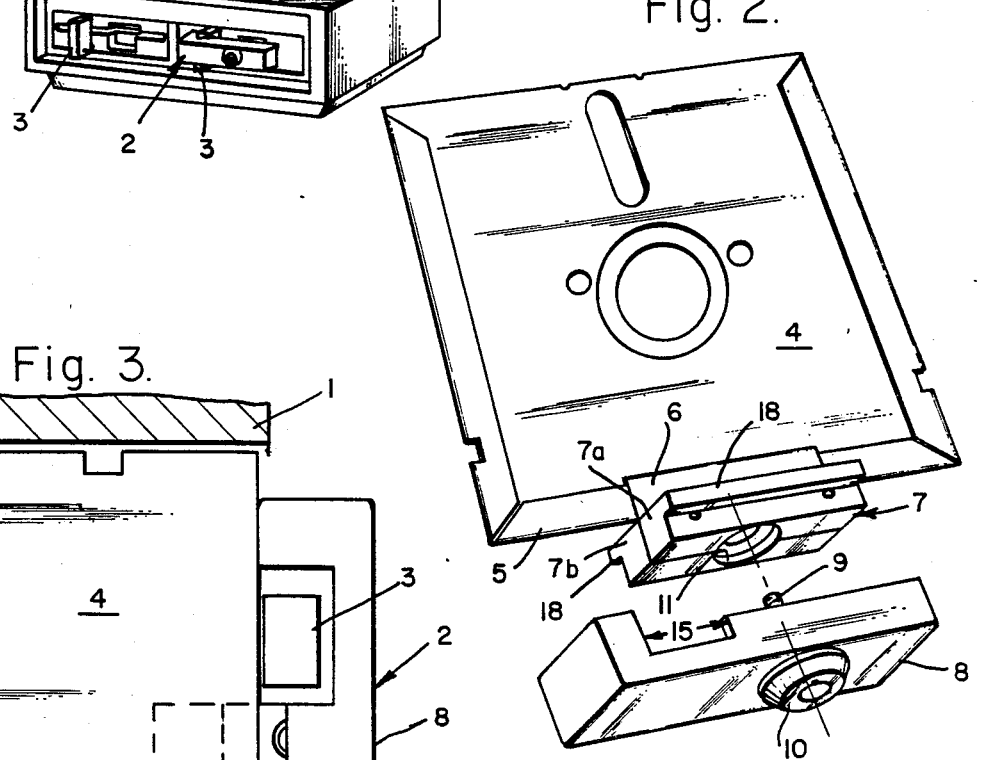
FIG. 2 is a perspective view of the first embodiment device diskholder assembly and the clamp cover assembly, showing a blank diskette attached to the diskholder and ready for insertion in a disk drive.

FIG. 2 shows the first embodiment locking device comprising two assemblies; a diskholder assembly 7 and clamp cover assembly 8. A blank diskette 4 is shown attached to the diskholder assembly 7 by a hook plate 6. Note that the hook plate 6 has a fold in it that is inserted in a fold in the diskette protector jacket 5. Thus holding on to it and also permitting relative sliding engagement between the diskholder assembly 7 and the diskette 4, so that the diskholder assembly 7 and clamp cover assembly 8 may be moved off center from the diskette 4 to fit the location of the disk drive lever 3 on a given PC.

Figure 3:
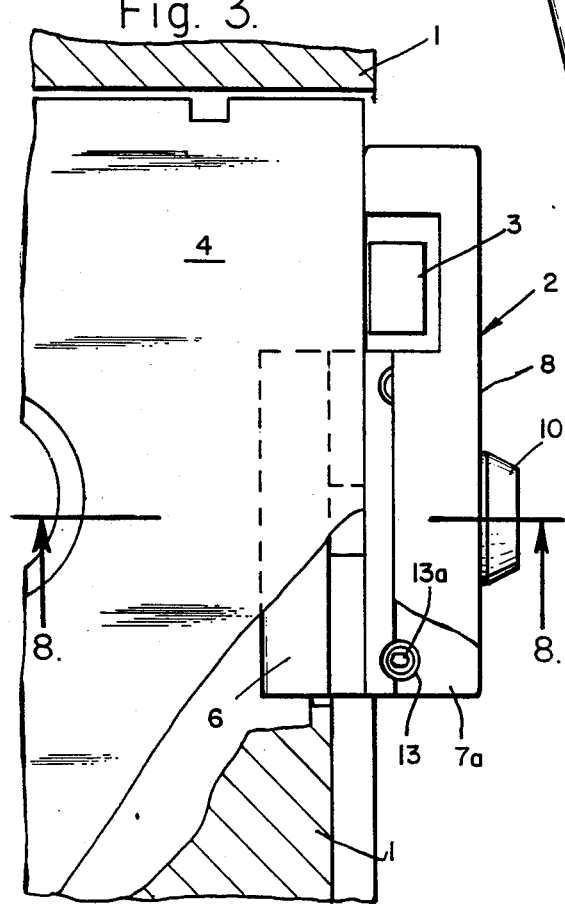
FIG. 3 is a partial top view of the present invention first embodiment inserted in a disk drive and showing the disk drive lever enclosed in the clamp cover assembly.

In use, the diskholder assembly 7 with the diskette 4 attached, is inserted in a selected disk drive and the drive lever 3 is rotated down, closing the drive. The clamp cover assembly 8 is then placed over the drive lever 3 so that a cutout or notch in the clamp covers the lever. The clamp lock screw 9 is mated with a screw hole in the vertical face of the diskholder assembly 7 and the lock screw is rotated by insertion of a key in the barrel lock 10 and rotating the key until the clamp cover assembly 8 is tightly seated against the diskholder assembly 7. This situation is shown in FIG. 3, which is a partial cut-away top view of the locking device inserted in a disk drive. The diskette 4 is being held by the drive at its center hole, while the drive lever 3 is enclosed by the cut-out 15 in the clamp cover assembly 8 of the locking device. The clamp cover 8 fits over recesses cut in the top and bottom surfaces of the diskholder assembly 7, thereby also partially covering the assembly fastener 13 in the diskholder assembly 7.

Figure 4:
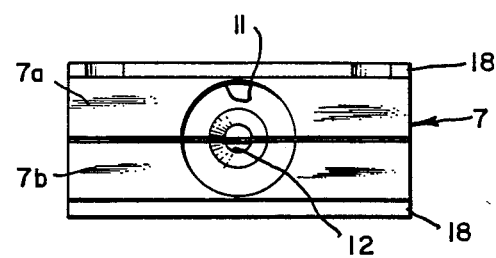
FIG. 4 shows the front elevation view of the diskholder assembly.
Figure 5:
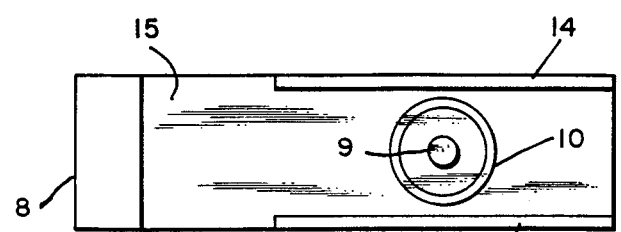
FIG. 5 is a plan view of the clamp cover assembly showing its inner face that fits with the front face of the diskholder assembly.

Referring now to FIGS. 4 and 5, there are shown respectively, a front vertical view of the diskholder assembly 7 and a plan view of the clamp cover assembly 8, both depicted in open "clam shell" arrangement. The diskholder assembly 7 is comprised of two blocks 7a and 7b, identically shaped and sized to fit together in mirror image. The blocks may be made of a non-ferrous metal or a suitable hard plastic material. In this first embodiment, a recessed surface 18 is cut in each block 7a and 7b to a depth of approximately 0.10 inches. When the two blocks 7a and 7b are held together by screws, or other fasteners allowing for the hook plate 6 between the blocks, a hole 12 is bored and tapped in the center of the vertical face. A bevelled clearance 11 is cut for the barrel lock seating. The diskholder assembly 7 is made approximately two inches wide. The clamp cover assembly 8 is made of a non-ferrous metal or suitable hard plastic and is approximately three inches long. It is shaped, formed or welded so that, as shown in FIGS. 2 and 3 it has an "L" leg perpendicular to its length on one end, and bent surfaces 14 attached along two edges of its length shown in FIG. 5. The bent surfaces 14 of the clamp cover 8 are sized to fit the recessed surfaces of the diskholder assembly 7. The effect of this arrangement is to produce a cut-out or notch 15 in the assembly. This cut-out or notch 15 is used to enclose the disk drive lever 3 when the device is locked in place. In the view of FIG. 5, the lock screw 9 is shown projecting forward "out of the paper". Because of its symmetry, the clamp cover assembly 8 may be rotated in position about the lock screw 9 with respect to the diskholder assembly 7, so that the cut-out 15 is located either on the left side or right side of the disk drive, depending on the location of the disk drive lever 3.

Figure 6:
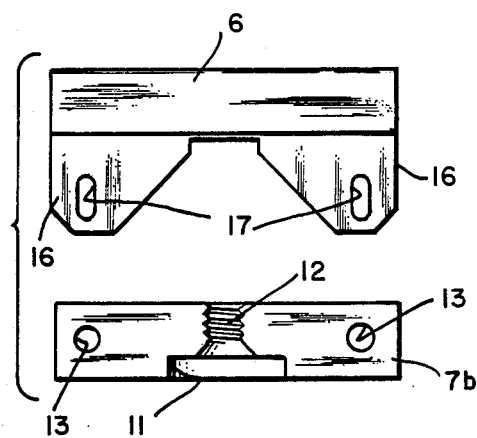
FIG. 6 is a plan view of the disk hook plate used in the first embodiment, showing its relationship to the diskholder assembly, a portion of which is shown located below the plate.

FIG. 6 is a plan view of the hook plate 6 and one of the blocks 7a of the diskholder assembly 7 used in the first embodiment. The hook plate 6 is made of 0.012 in. stainless steel sheet or other suitable non-ferrous metal, and is approximately two inches long, fitting the length of the diskholder assembly 7. The hook plate 6 is folded on its two inch edge with a fold that is approximately one fourth inch deep. This fold can be seen in FIGS. 7 and 8, and is for the purpose of engaging the fold of the diskette jacket 5. Two ears 16 are shaped, one at each end for the purpose of being clamped by the diskholder assembly 7. First and second holes 13 are bored near the distal ends of the diskholder assembly block 7a for accommodation of fastening screws or rivets. Each ear 16 has a slot 17 cut in it. These slots 17 fit over the holes 13a in block 7a and enable adjustment of the relative position of the hook plate 6 when held by the diskholder assembly 7.

Figure 7:
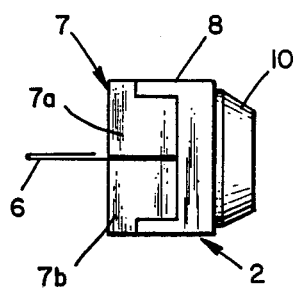
FIG. 7 is a side elevation view of the present invention first embodiment without a diskette attached, but showing the two assemblies locked together.
Figure 8:
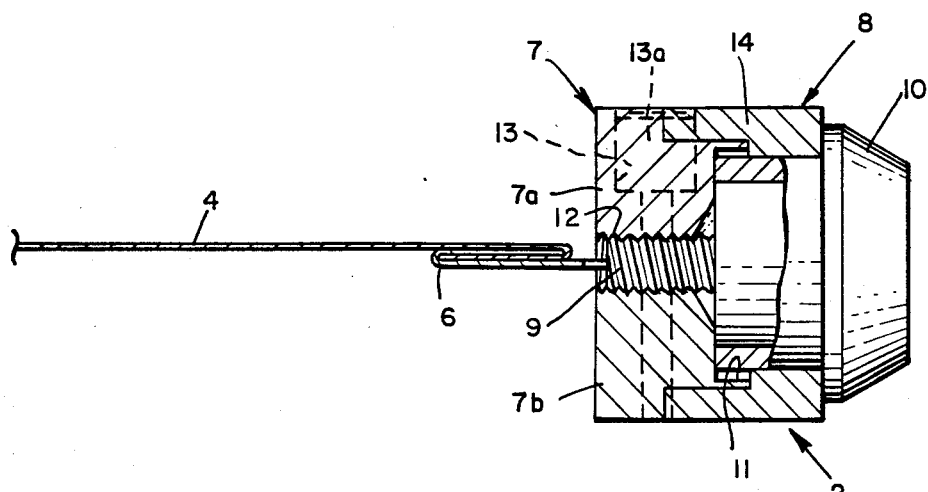
FIG. 8 is a cross section view of the present invention, first embodiment inserted in a disk drive, the view being taken along line 8—8 of FIG. 3.

Referring now to FIGS. 7 and 8, the relationship of the assembled parts of the first embodiment invention is shown in the side elevation view of FIG. 7 and the cross-sectional view of FIG. 8. As can be seen, the hook plate 6 is clamped between the two blocks of diskholder assembly 7, while the bent surfaces 14 of clamp cover assembly 8 fit against the recessed edge 18 of the diskholder assembly 7. The two assemblies are drawn together by the action of rotating lock screw 9 by barrel lock 10.

The foregoing discussion, has described a locking device intended for locking the disk drives of those types which utilize a lever for closure. These are typically the type of drives installed on "IBM" PC clones and the like. However, the "MACINTOSH" PC's and similar types do not have levers on their disk drives. The first embodiment of the locking device, as described, would therefore not be applicable to the "MACINTOSH" type disk drive. A modification of the first embodiment locking device is then in order and is presented herein.

Figure 9:
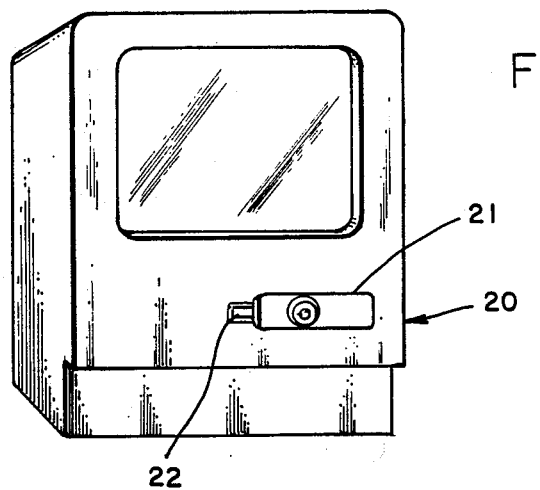
FIG. 9 is a perspective view of a typical "MACINTOSH" type PC showing the present invention locked in place in the disk drive.

Referring particularly to the drawings, there is shown in FIG. 9 a perspective view of a "MACINTOSH" type PC 20, with the present invention locking device 21 inserted and locked in place in the disk drive 22. The assemblies comprising this second embodiment of the device are depicted in perspective view in FIG. 10. These are the modified clamp cover assembly 23 and the modified diskholder assembly 25. The clamp cover assembly 23 is almost identical to the clamp cover assembly shown in FIGS. 2 and 3 and described earlier.

The only modification to the clamp 23 is the addition of an end projection 24 to its right end. This balances the end projection at its distal end and allows the clamp cover assembly 23 to apply pressure evenly on the face of the disk drive. When the clamp cover assembly 23 engages the diskholder assembly 25 with its locking screw, the diskholder assembly blocks 28a and 28b are sized to nest within the bent edges of the clamp cover assembly 23.

The modified diskholder assembly 25, actually includes a tongue piece 26, that serves as a quasi-disk in anchoring the assembly when inserted in the disk drive 22 slot. This tongue piece 26 is made of a plastic sheet material, approximately 0.060 in. thick and approximately two inches long, fitting the length of the diskholder assembly 25. The diskholder assembly 25 is further comprised of two blocks 28a and 28b, identically shaped and sized to fit together in mirror image. These blocks may be a nonferrous metal or a suitable hard plastic material and are held together by screws or rivets.

Figure 11:
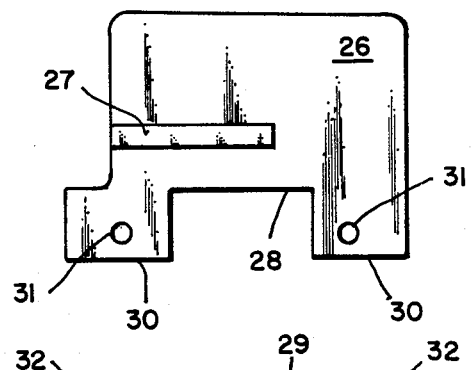
FIG. 11 is a plan view of the tongue piece or quasi-disk.
Figure 12:
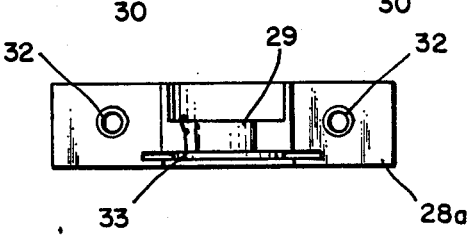
FIG. 12 is a plan view of the lower portion of the diskholder assembly, particularly showing the surfaces that engage the tongue piece and a section of the thread for engaging the locking screw of the clamp cover.
Figure 13:
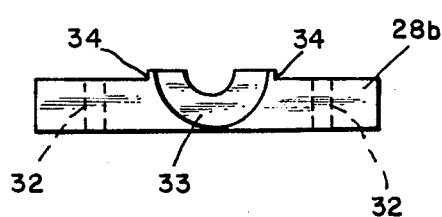
FIG. 13 is a side elevation view of the upper portion of the diskholder assembly.

Referring finally to FIGS. 11, 12 and 13, there are shown views of the tongue piece 26 and the lower block 28b of the diskholder assembly 25. The tongue piece 26 shown in plan view in FIG. 11, is shaped with two ears 30 and a cutout 28 for the purpose of being clamped by the two blocks 28a and 28b. A ridge projection 27, which is approximately one inch long and ⅛th inch high is formed on the surface of the piece 26, and located to one side, running laterally on the surface from left to right. This ridge projection 27 bears against the inside surface of the disk drive 22 slot when in place, and holds the diskholder assembly from being pulled out. First and second holes 31 are bored in the ears of the tongue piece 26 for use in its attachment to the blocks 28a and 28b.

The lower block 28b shown in FIGS. 12 and 13 and the upper block 28a equally, have first and second holes 32 bored near its distal ends for accommodation of fastening screws 35 or rivets. A notch, or recess 34, is cut in the surface of the blocks 28a and 28b, over two thirds of its area except for the center third, allowing the ears 30 of the tongue piece 26 to be seated. When the two blocks 28a and 28b are held together with the tongue piece 26 in place, a screw hole 29 is bored and tapped or a screw fitting is emplaced in the center of the vertical face. A bevelled clearance 33 is cut for the barrel lock seating.

Figure 10:
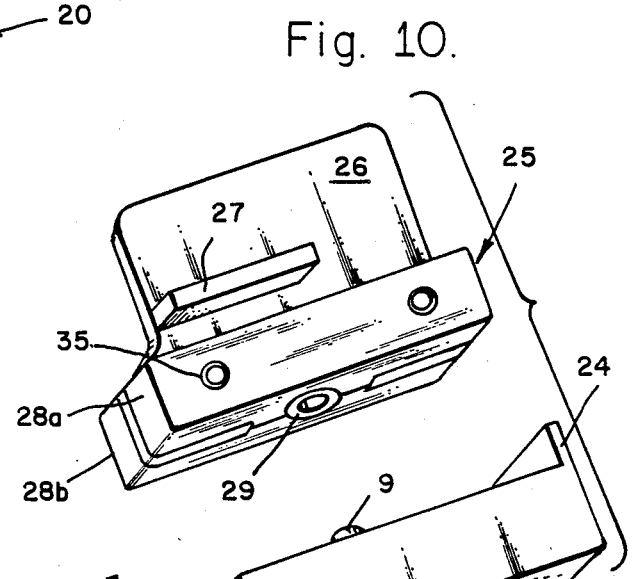
FIG. 10 is a perspective view of the second embodiment diskholder assembly and clamp cover assembly, showing the relationship between the two assemblies, and showing the diskholder assembly ready for insertion of its projecting tongue piece in a disk drive.

From the FIG. 10 illustration, it will be noted that the clamp cover assembly shown for the second embodiment may be used also in the first embodiment of the device. However, since the first embodiment clamp cover does not incorporate an added end projection 24, it should not be used for the second "MACINTOSH" type application unless some lock covers were made with the added end projection.

From the foregoing discussion, it can be noted that the major difference between the first and second embodiment operation is as follows: Whereas the first embodiment depends on a blank diskette, which is clamped by closure of the disk drive, to hold the diskholder assembly, the second embodiment uses a ridged plastic tongue that bears hard against the inside edge of the drive slot. No closure by lever is necessary. Furthermore, in the second embodiment, the clamp is required to bear directly against the front surface of the disk drive in order to pull the ridged plastic tongue hard against the inside edge of the drive slot. This is required only in the "MACINTOSH" PC type floppy disk drive application.

From the foregoing description, it is believed that the first and second embodiments described achieve the objects of the present invention. Alternative modifications of the embodiments depicted will be apparent to those skilled in the art. These are considered to be equivalent and within the spirit and scope of the present invention.

Having described the invention, what is claimed is:

1. A locking device for insertion in a disk drive of a Personal Computer (PC), such that when said device is locked in place, said disk drive is disabled; said locking device comprising a diskholder assembly, a clamp cover assembly and a blank diskette; said diskholder assembly including a means for attaching said diskette to said diskholder; said diskholder assembly being attached to said diskette which is clamped by said disk drive and is acting as a support for said clamp cover assembly; said clamp cover assembly comprising a rectangular shaped clamp cover made of a non-ferrous metal or a suitable hard plastic and a barrel lock, said barrel lock operating a locking screw that mates with a tapped screw holder in said diskholder assembly; said clamp cover having bent surfaces that align with recessed surfaces of said diskholder assembly when said clamp cover assembly is moved into its locking position and when said locking screw is engaged in said tapped screw hole in said diskholder assembly in order to lock the device; said clamp cover having an opening formed in one end and sized to lie across the lever of said disk drive, preventing the lever from being rotated and opening said disk drive when said clamp cover assembly is tightened in position by rotation of a key in said barrel lock.

2. A locking device as set out in claim 1 wherein: the means for attachment of said blank diskette to said diskholder includes a metal hook plate made of thin sheet stainless steel, having a fold in one edge of approximately two inches wide by one-fourth inch deep and shaped with two ears, said ears having a slot cut in each; said plate fold for engaging with the fold of said blank diskette jacket, thus attaching to it; said ears and slots for the purpose of being held clamped by said diskholder assembly; said slots enabling adjustment of the relative position of said plate fold where held by said diskholder assembly.

3. A locking device as set out in claim 1 wherein: said diskholder assembly is comprised of two blocks made of a non-ferrous metal or a suitable hard plastic material, identically shaped and sized to fit together on one surface and forming a clamping surface for the ears of said metal hook plate when said metal hook plate is placed between the two blocks and fastened with inserted screw or rivet fasteners; said each block having its non-clamping opposite surface recessed by approximately 0.10 inch to accommodate and nest with said clamp cover assembly, and having first and second holes bored through said recessed surface to accommodate screw or rivet fasteners; said diskholder assembly being made of non-ferrous metal or hard plastic to avoid any possible magnetic influence on the disk drive or computer.

4. A locking device for insertion in a floppy disk drive of a Personal Computer (PC), such that when said device is locked in place, said disk drive is disabled; said locking device comprising a diskholder assembly, a clamp cover assembly and a blank diskette; said diskholder assembly including a means for attachment to said diskette that permits relative sliding engagement between said diskette and said attachment means, permitting said diskholder assembly and said clamp cover assembly to be moved off center from said diskette over a range, in order for said clamp cover assembly to fit over the disk drive lever; said disk drive lever being located over a range of positions on the front of the disk drive, depending on the drive manufacturer; said clamp cover assembly incorporating a barrel lock which operates a locking screw that mates with a tapped screw hole in said diskholder assembly; said clamp cover assembly utilizing said locking screw so that said clamp cover assembly may be rotated in position with respect to said diskholder assembly, and be able to cover a disk drive lever on the left side or right side of the disk drive; said clamp cover assembly when tightened in position against said diskholder assembly face, preventing the disk drive lever from being rotated and opening said disk drive; said blank diskette inserted in said disk drive, preventing use of said disk drive to read files contained on other diskettes and, where said drive is normally used to "boot up" the operating system, also preventing operation of the computer.

5. A locking device for insertion in a floppy disk drive of a Personal Computer (PC), such that when said device is locked in place, said disk drive is disabled; said locking device having components which act in mechanical cooperation with said disk drive and the front surface of said PC to close off access to said disk drive; said locking device comprising a diskholder assembly and a clamp cover assembly; said diskholder assembly including a means for attaching itself to said disk drive; said clamp cover assembly comprising a rectangular shaped clamp cover made of a non-ferrous metal or a suitable hard plastic and a barrel lock, said barrel lock operating a locking screw that mates with a tapped screw hole in said diskholder assembly; said clamp cover having bent surfaces that are aligned with the longitudinal surfaces of said diskholder assembly when said clamp cover assembly is moved into its locking position; said clamp cover plate having bent projections at each of its ends for the purpose of bearing against the front surface of said PC; said clamp cover assembly preventing access to said disk drive when said clamp cover assembly is tightened in position by rotation of a key in said barrel lock.

6. A locking device as set out in claim 5 wherein the means for attaching said diskholder assembly to said disk drive includes a tongue piece made of plastic sheet material, approximately 0.60 inch thick and 2 inches long, fitting the length of said diskholder assembly; said tongue piece having a ridge projection approximately 1 inch long and 0.125 inch high formed on its surface and located to one side, running laterally on said tongue piece surface from left to right, said ridge projection for the purpose of bearing against the inside wall of said disk drive slot when in place; said tongue piece being shaped with two ears, said ears having a hole bored in each for the purpose of being held clamped by said diskholder assembly.

7. The diskholder assembly and tongue piece of claim 6 wherein: said diskholder assembly is comprised of two blocks; said blocks being made of a non-ferrous metal or a suitable hard plastic material, identically shaped and sized to fit together on one surface and forming a clamp cover for the ears of said tongue piece when said tongue piece is placed between them and fastened with inserted screw fasteners or rivets; said each block having first and second holes bored through its surface for accommodation of screw fasteners or rivets; said blocks, when held together by screws and with the tongue piece inserted between said blocks, incorporating a screw holder bored and tapped for the purpose of engaging with said locking screw on said clamp cover assembly; said diskholder assembly being made of non-ferrous metal or plastic so as to avoid any possible magnetic influence on the PC.

* * * * *